May 12, 1936.  C. V. BOYS  2,040,199
GAS DELIVERY APPARATUS
Filed July 16, 1934   3 Sheets-Sheet 3

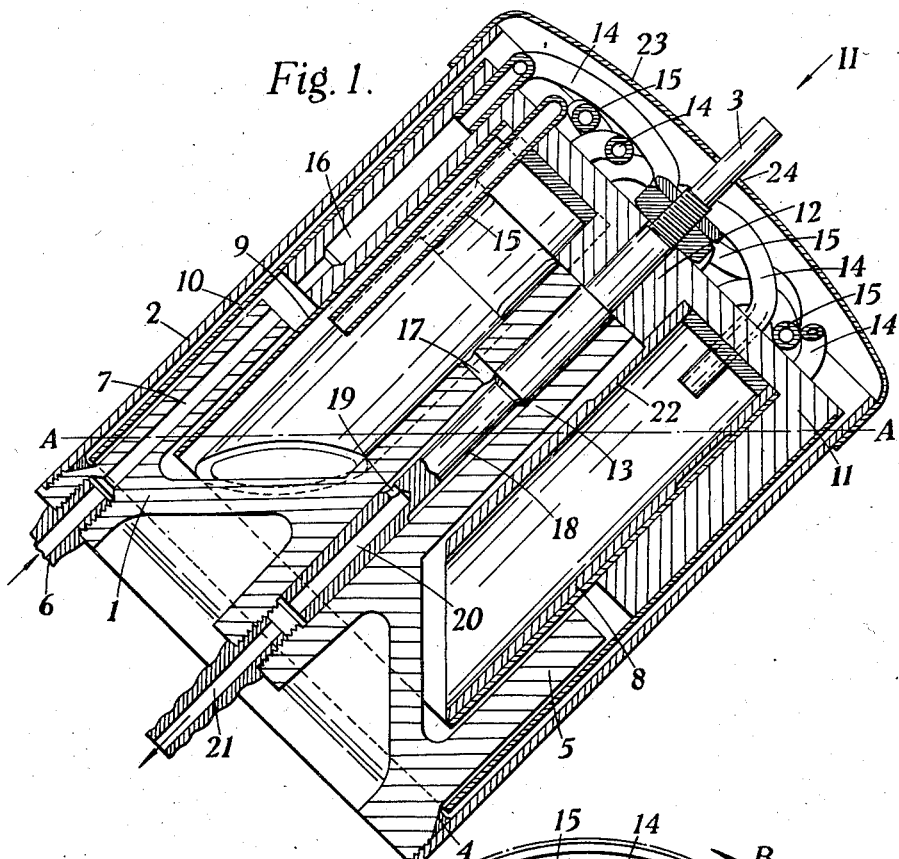
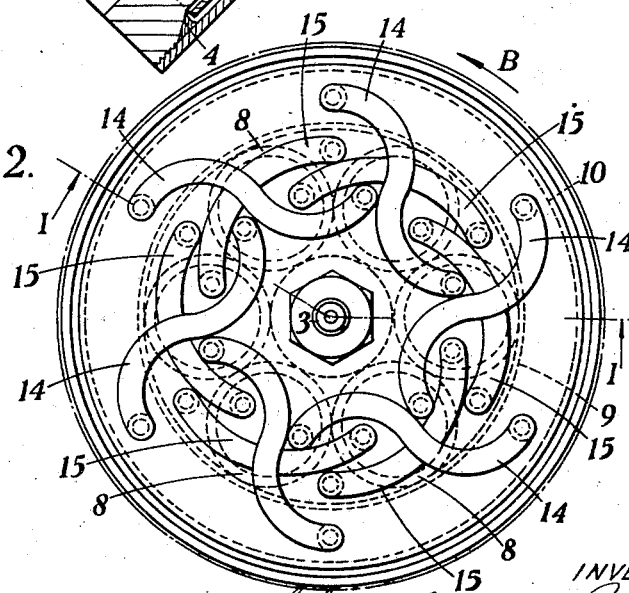

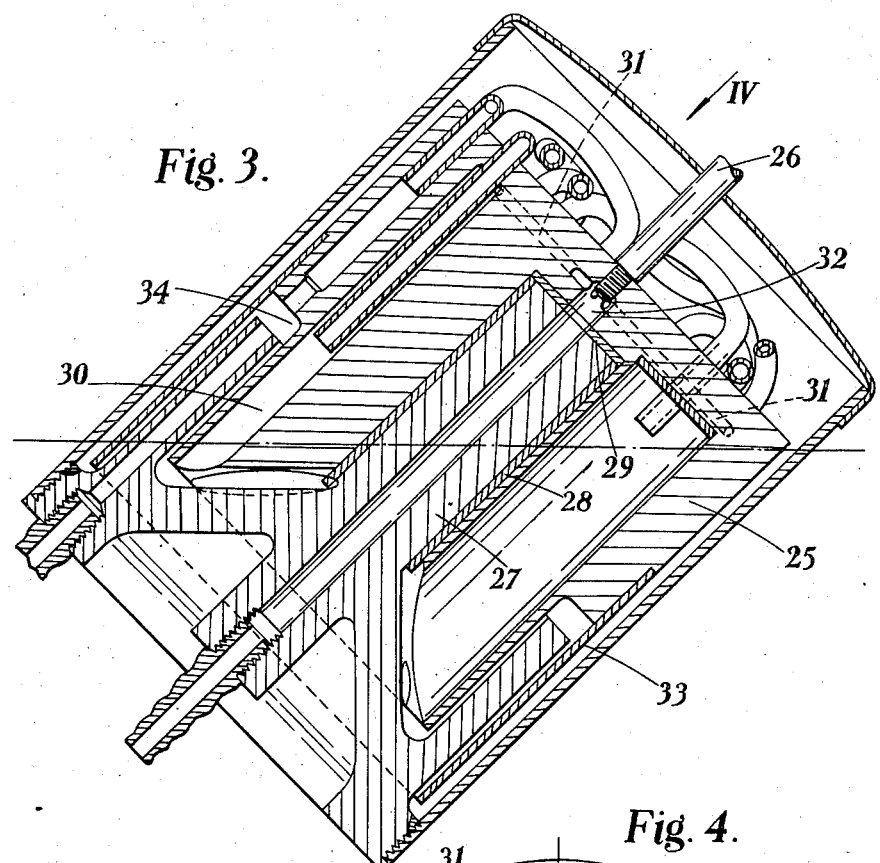
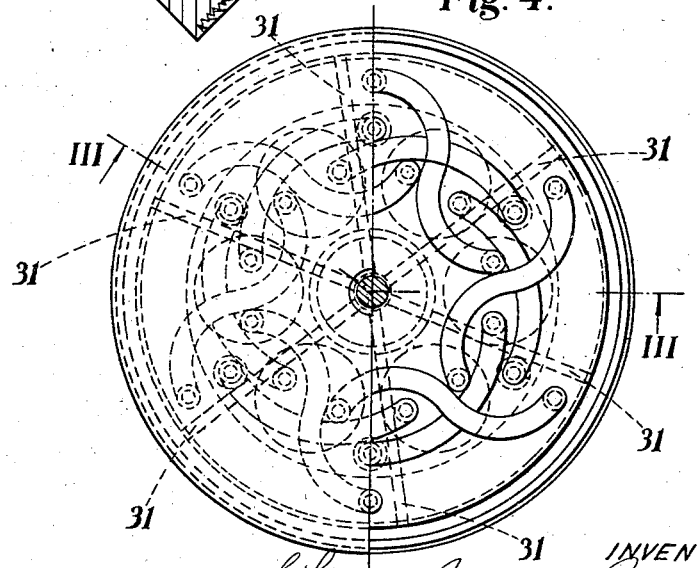

Patented May 12, 1936

2,040,199

UNITED STATES PATENT OFFICE 2,040,199

GAS DELIVERY APPARATUS

Charles Vernon Boys, London, England

Application July 16, 1934, Serial No. 735,503
In Great Britain April 10, 1934

8 Claims. (Cl. 73—1)

The invention relates to gas delivery pumps for doling out gas at a predetermined rate with great precision.

A well recognized method of doling out gas is to drive an ordinary meter drum so that it rotates in water, by external mechanical means but an ordinary meter, so used, is subject to the disability that if there is any difference in pressure between the gas entering and the gas leaving the instrument, the water floor of each measuring compartment is raised or lowered and the capacity of the meter is, to that extent, altered. Further, meters with their drums turning in water impregnate the gas to saturation, or nearly so, with water vapour and to that extent, dilute the gas so that when burned, for example in a calorimeter, it does not give the heat which the indicated volume of the dried gas would give and corrections are necessary to counteract the effect of this contamination which cannot be made to follow the varying dryness of the gas.

The invention aims at providing an apparatus in which the two faults mentioned above may be eliminated and which may be of so simple and permanent a character that when set up correctly, it may be relied upon to work satisfactorily for an indefinite period.

One object of the invention consists in a delivery pump including a rotor comprising at least four measuring bells which by virtue of the rotation of the rotor move up and down with regular frequency in a liquid bath. Gas inlet and exhaust conduits connected to the bells are so arranged that gas is drawn into the bells only when they are rising and discharged from the bells only when they are falling.

Another object of the invention consists in a delivery pump including six measuring bells arranged equidistantly around and parallel with an oblique axis of rotation, the bells being connected together with their walls in contact so as to form a compact rotor. The ends of the bells dip into a receptacle for liquid so that when the rotor is rotated, the space within each bell above the liquid surface alternately expands and contracts. By using six bells a delivery pump is obtained which has the maximum capacity relatively to its size. This would be the case if no provision had to be made for gas conduits arranged to lead gas into and away from the bells, but as the conduits would have to be outside the bells with any number other than six, the increase in dimensions would be still more pronounced.

A further object of the invention consists in a delivery pump including a rotor embodying at least four cylindrical measuring bells, a receptacle, means for supporting the rotor in a position such that its axis is inclined and the ends of the measuring bells extend downwards into the receptacle, mercury within the receptacle serving to seal the measuring bells in all positions of the rotor, means for enclosing two gas spaces over the surface of the mercury and gas inlet and exhaust conduits connected to the bells and operative to put each bell into communication with the gas inlet space only when the bell is rising and with the gas outlet space only when the bell is falling. The use of mercury is advantageous because if the gas has been partially dried it is not wetted by passing through the pump.

Yet another object of the invention consists in a delivery pump including a rotor embodying a number of measuring bells which by virtue of rotation of the rotor rise and fall in a liquid bath, gas spaces sealed by the liquid in the bath and inlet and exhaust conduits operative when the rotor is rotated to permit gas to pass from one of the gas spaces to each bell only when the bell is rising and from each bell to the other of the gas spaces only when the bell is falling, the arrangement being such that the inlet and exhaust conduits of each bell are both sealed by the liquid so that the bell is cut off from both gas spaces when the bell is at its extreme upper position and when it is at its extreme lower position. The pump is such that the gas inlet and outlet spaces are never in communication and that the moving parts of the pump may be lifted easily out of the bath so that the fixed and moving parts may be cleaned, the arrangement being such that when the parts are put together again, the pump will run correctly without further adjustment. Such cleaning may be necessary where the gas is contaminated with dust or tar fog.

More particularly defined the invention consists in a delivery pump for doling out gas at a predetermined rate, comprising in combination, a rotor mounted for rotation about an inclined axis and including at least four cylindrical measuring bells equidistantly spaced about the axis of rotation of said rotor, a receptacle for liquid, said rotor being supported in a position such that the ends of said measuring bells extend downwards into said receptacle so that said measuring bells may be sealed by liquid in said receptacle in all positions of said rotor and walls defining two gas spaces adapted to be sealed by liquid in said receptacle, said rotor being formed with gas inlet and exhaust conduits operative when said receptacle contains liquid and said rotor is rotated to put each bell into communication with said gas inlet space only when the bell is rising and with said gas outlet space only when the bell is falling, the arrangement being such that the inlet and exhaust conduits of each bell are both sealed by the liquid so that the bell is cut off from both gas spaces when the bell is at its extreme upper position and when it is at its extreme lower position, and passages being provided for supplying gas to the space from which said measuring bells are supplied and for leading gas away from the space to which the measuring bells deliver gas.

The invention further comprises the elements and combinations of parts set forth in the annexed claims.

In order that the invention may be clearly understood and readily carried into effect, pumps constructed in accordance therewith will now be described by way of example with reference to the accompanying drawings, in which:—

Figure 1 is a vertical section on the line I—I of Figure 2 and shows one pump according to the invention;

Figure 2 shows an end view of the pump shown in Figure 1, with the cover removed, as seen when looking in the direction of the arrow II;

Figure 3 is a cross-section on the line III—III of Figure 4 and shows a modified form of pump;

Figure 4 shows an end view of the pump shown in Figure 3 as seen when looking in the direction of the arrow IV. The left half of this figure shows the cover in position, while the right half shows the pump with the cover removed;

Figure 5:
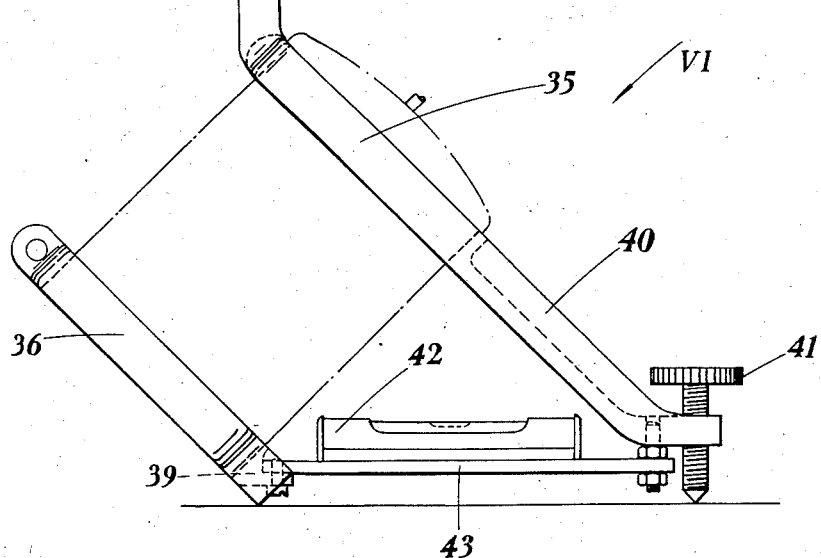
Figure 5 shows an elevation of a support for the devices shown in Figures 1 to 4.

Referring to Figures 1 and 2, the pump comprises a stationary cylindrical mercury container, consisting of a cast iron base 1 secured to a steel tube 2, and an assembly arranged to be rotated within the stationary container by means of a spindle 3. The latter may be conveniently driven by means of a small electric motor through the medium of sprockets and a chain. The steel tube 2 is fixed to the base 1 by means of a shallow screw thread and the joint between the two parts is made mercury tight by means of bitumen, the two parts being heated and coated with bitumen before being screwed together. The joint is made absolutely sound by means of a bitumen seal 4 located immediately above the screw-threaded joint. The apparatus is supported so that its axis is inclined at an angle of 45 degrees and the surface of the mercury is at the level indicated by the line A—A in Figure 1. The base 1 is formed with a cylindrical projection 5 which lies close to the tube 2 and is concentric therewith. The gas is admitted to the apparatus through a nozzle 6 which communicates with a drilled hole 7 in that part of the cylindrical projection 5 which lies above the level of the mercury. The nozzle 6 shown is of the kind shaped to fit inside the end of a rubber gas connection but an ordinary gas union may be used.

The rotary parts of the apparatus are fixed rigidly together and comprise six tubes, providing measuring bells 8 turned and reamed accurately alike, and two skirts 9 and 10 which are fixed at their upper ends to a cast iron cup-shaped rotor 11. The latter is fixed rigidly to the spindle 3 and a boss 12 at its centre rests upon the upper end of a central cylindrical stem 13 integral with the stationary base 1. The skirts 9 and 10 are concentric with each other and with the ring 5, the latter lying between the two skirts, and are of such a length that their lower edges always lie beneath the surface of the mercury in all positions of the rotor 11.

Each of the measuring bells 8 is provided at its upper end with an inlet pipe 14 and an outlet pipe 15. The cylindrical wall of the rotor 11 is drilled with six passages 16, each of which is connected at its upper end with one of the inlet pipes 14. The diameter of each of the passages 16 is reduced at its lower end so as to correspond with the internal diameter of the inlet pipes 14. The outlet pipes 15 lead into the space within the inner skirt 9.

It is clear that the arrangement is such that, as a result of the obliquity of the axis of the apparatus, the measuring bells 8 rise and fall in the mercury bath during their rotation about the axis. Rotation takes place in the direction of the arrow B in Figure 2. The gas inlet conduits, constituted by the passages 16 and pipes 14, and the gas outlet conduits, constituted by the pipes 15, are so arranged that as the bells rise the spaces in the bells above the mercury are put into communication with the space between the skirts 9 and 10 which constitute a gas inlet space and as the bells fall they are put into communication with the space within the skirt 9 which constitutes a gas outlet space. The bells serve to transfer the gas from the inlet gas space to the outlet gas space, the latter being in communication with passages, hereinafter described, that serve to lead the gas out of the apparatus. The inlet and outlet gas conduits act in the manner indicated because, in the case of each measuring bell 8, the inlet end of its respective inlet passage 16 and the outlet end of its respective outlet pipe 15 lie in a plane which contains the axis of the apparatus and is at right angles to the plane which contains the axis of the bell and the axis of the apparatus. Thus, the gas inlet is 90 degrees ahead of the bell and the gas outlet is 90 degrees behind the bell so that the inlet end of the inlet conduit is above the surface of the mercury during the time when the bell is rising and the outlet end of the outlet pipe is above the level of the mercury during the time when the bell is falling. Further, the apparatus is arranged so that each bell is in communication with one of the gas spaces at all times, except when it is in its highest and lowest positions, that is when there is no appreciable variation in the volume above the mercury within the bell, because the lower ends of the drilled passages 16 and the outlet pipes 15 lie in a plane which is at right angles to the axis of the apparatus and intersects the said axis at a point which is below the point where the axis joins the level of the mercury. It will be appreciated that this arrangement insures that when a bell is in its highest or lowest position, both its inlet pipe and its outlet pipe are sealed by the mercury so that the inlet gas space and the outlet gas space are never put into communication with each other.

Gas continually enters the space between the skirts 9 and 10 through the drilled hole 7, is drawn into the bells 8 and is then discharged into the outlet gas space within the skirt 9 which it leaves by passing through an aperture 17 in the fixed cylindrical stem 13. The gas then passes through an annular space 18 between a portion of the spindle 3 which is reduced in diameter and the inner surface of the stem 13 to an aperture 19 in the spindle 3 which leads to an axial bore 20 in the lower end of the spindle 3. After passing through the bore 20 the gas reaches a nozzle 21 which is fitted to the centre of the base 1 and which may be connected by means of a rubber pipe to the point where the gas is required or be made to take a gas union.

In order to make the apparatus as compact as possible the six measuring bells 8 are in contact with each other and they fit tightly within the inner skirt 9, the boss 12 of the cup-shaped rotor 11 being of the same diameter as the outside diameter of the bells. In order to enable the gas to pass between the outer surface of the measuring bells 8 to the aperture 17, the outer circumference of each of the bells is reduced near its upper end at 22. It will be seen that there is an annular space between the stem 13 and the measuring bells 8. The gas enters this space after passing between the bells at their reduced portions 22 and passes directly from the space to the aperture 17.

The lower ends of the measuring bells are cut off at 45 degrees (as shown in Figure 1) and the space between the lower ends of the bells and the conical part of the base 1 is arranged so as to afford an easy passage for the mercury which is constantly flowing from the rising measuring bells on one side to the descending measuring bells on the other.

The inner skirt 9, the six tubes forming the measuring bells and the gas inlet and outlet pipes 14 and 15 are all sealed gas tight by a thick layer of bitumen or other cement which was melted in the rotor 11, when inverted, before the skirt 9 and measuring bells 8 were placed in position. The outer skirt 10 is cemented to the rotor 11.

A loose cover 23 slips over the upper end of the mercury container and serves to keep out dust and dirt. The spindle 3 projects through a hole 24 at the centre of the cover. When it is desired to clean the apparatus all that is necessary is to disconnect the spindle 3 from the driving chain, remove the cover 23 and lift out the rotor 11 which carries all the moving parts of the apparatus. All the gas spaces and the mercury bath can then be inspected and cleaned.

It will be appreciated that if the direction of rotation of spindle 3 is reversed, the apparatus will work equally well but the nozzle 21 becomes the gas inlet, while the nozzle 6 becomes the gas outlet.

The action of the construction shown in Figures 3 and 4 is identical with that of the construction shown in Figures 1 and 2, but the structure of the apparatus is somewhat different. The main difference lies in the fact that the measuring bells, instead of being separate tubes that are fixed to a rotor, consist of bores in a cylindrical rotor 25, the bores being drilled and reamed with a shell reamer from the solid. The latter is rotated through the medium of a spindle 26 which is fixed to its upper end, but does not project into the central bore in the central stationary stem 27 of the apparatus. The rotor 25 runs on a steel sleeve 28 and washer 29. The arrangement of the gas inlet space and the gas inlet pipes is substantially the same as that in the apparatus described with reference to Figures 1 and 2. The gas outlet space, however, is different and consists of six cylindrical cavities 30 formed in the rotor 25 and joined by means of radial passages 31 at their upper ends with a central hole 32, the lower end of which communicates with the bore at the centre of the central stem 27. Each of the gas outlet pipes leads from its respective bell to one of the cavities 30 and extends downwards to a point which is on the same level as in the case of the apparatus shown in Figures 1 and 2. The gas, after leaving one of the bells, passes through the appropriate outlet pipe to one of the cavities 30 and thence through one of the radial passages 31 to the central hole 32 to the central passage in the stem 27. The rotor 25 only carries one skirt 33 which is equivalent to the skirt 10 in the apparatus shown in Figures 1 and 2. The gas inlet space is constituted by an annular cavity 34 bounded by the skirt 30 and a part of the outer surface of the rotor 33 which is reduced in diameter.

The radial passages 31 are formed by drilling from the circumference of the rotor 25 to the central hole 32 and then plugging their outer ends.

The washer 29 may advantageously be replaced by a ball thrust bearing. In some cases it may be preferred to form the gas measuring bells by drilling and reaming from the upper end of the rotor 25 and plugging the upper ends of the holes so formed.

In both the constructions described above, the gas space in each measuring bell increases and diminishes harmonically with the rotation.

The capacity of a gas doling instrument of the kind described above, may be found by means of the following formula:—

Volume of gas doled out per revolution= $12ar \tan \theta$ where $a$ is the sectional area of any measuring bell, $r$ is the distance of its axis from the axis of rotation of all the bells, and $\theta$ is the angle of tilt from the vertical. The quantities $a$ and $r$ can be reproduced with great accuracy during the manufacture of the apparatus and the angle can be fixed at the required value when the apparatus is set up ready for use.

The rotor shown in Figures 3 and 4 may be formed by moulding it from a molding composition such as "Bakelite". When the rotor is made from "Bakelite" it must be weighted so that it rests firmly on its bearing. When the rotor is formed by drilling and reaming, as described above, cast iron is a suitable material, and of course in this case there is no necessity to load the rotor.

Figure 6:
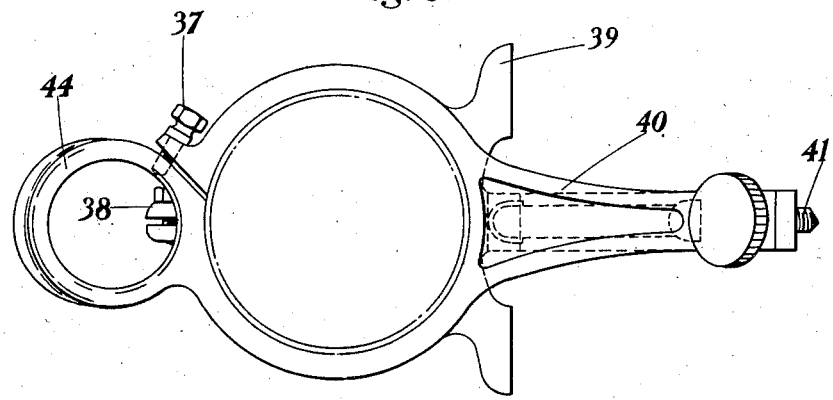
Figure 6 shows a plan of the support shown in Figure 5 looking in the direction of the arrow VI.

Figures 5 and 6 show a support for the apparatus by means of which the angle of its axis (that is the angle $\theta$) may be fixed very accurately. Referring to these figures, it will be seen that the casing of the gas doling device is held in two straps 35 and 36 which are caused to clamp the apparatus tightly by means of screws 37 and 38. The strap 36 is formed with a transverse base 39 which rests on the surface of the place where the apparatus is required to stand. The strap 35 has an integral projection 40, the lower end of which carries a micrometer screw 41 with a knurled head. The tip of the screw co-operates with the base 39 to support the apparatus. The base 39 is formed with a V-shaped edge so that there is line contact between the latter and the surface and so that the whole apparatus can swing about the line of contact as the screw 41 is screwed through the projection 40. The position of the gas doling device is indicated by means of a spirit level 42 supported on a platform 43 fixed at one end to the extension 40 and at the other end to the base 39. The strap 35 is formed with a handle 44 which is set at such an angle that it lies in a plane which contains the centre of gravity of the apparatus, so that when the apparatus is lifted it will not tend to tilt and cause mercury to be spilt.

In order initially to set the spirit level 42 correctly relatively to the main body of the support, the instrument is connected to a gas measuring bottle and is set into operation. The micrometer screw 41 is then adjusted until the angle of tilt of the instrument (that is the angle θ) is such that the capacity is shown to be exactly correct. When this position has been found, the position of the spirit level is adjusted, without moving the instrument, until the bubble in the spirit level is central. This adjustment is effected by turning the nuts and studs by which the platform 43 is connected to the strap 36 and the projection 40. If, thereafter, the instrument is placed in any new position and the micrometer screw is turned until the spirit level 42 shows level the working capacity of the apparatus will be correct.

When gas doling apparatus of the kind described above is used in a recording calorimeter incorporating a water doling device of the kind set forth in patent application Serial No. 735,502 filed 16th July, 1934, it may conveniently be driven from the same motor as that used to operate the water doling device or from one of the shafts of the latter.

It is a known property of wet gas meters which work on an inclined axle that, unlike the usual wet meters with horizontal axles, their gas passing capacity is not only controlled by the water level but that change of inclination provides the control of capacity. It must not therefore be assumed that in the present invention the mercury level is not important. If the level is above the lowest which will definitely seal simultaneously both inlet and outlet of each compartment then the sudden release of the slightly pent up gas causes at first a flicker and as the level is made higher a greater disturbance of the flame which should be avoided in a calorimeter. Further if the gas pressures entering and leaving the instrument are not very closely the same, then as each compartment passes a disturbance of the flame will be seen. Further if the pressure of the gas leaving the instrument is greater than that of the entering gas a very small amount of exit gas will be returned to the entering gas at each passage of a compartment, thus diminishing the working capacity. In this respect the result is similar in kind to that found with the ordinary wet meter driven mechanically but owing to the high density of mercury the discrepancy is only one thirteenth of what it would be if water were used. It is therefore, of the first importance that the gas entering should be governed by a delicate governor so that the pressure of the gas entering and leaving as indicated by a U-tube gauge should have no appreciable difference of pressure. Also in order to ensure that the mercury level is at its lowest practicable level it is advisable when setting up the instrument to start with insufficient mercury and gradually to add the liquid until the escape of gas under the cover ceases. This is known at once if a tube from the exit nozzle is dipped to a very slight extent in water. So long as gas does not bubble through during the complete rotation some gas is escaping. When the instrument is set up with these precautions and with well governed gas inlet pressure, the passage of the successive compartments is not indicated by any flicker in the flame.

I claim:—

1. A gas delivery pump for doling out gas at a predetermined rate, comprising in combination, a rotor mounted for rotation about an inclined fixed axis and including at least four cylindrical measuring bells equidistantly spaced about the axis of rotation of said rotor, a receptacle for liquid, said rotor being supported in a position such that the ends of said measuring bells extend downwards into said receptacle so that said measuring bells may be sealed by liquid in said receptacle in all positions of said rotor, walls defining two gas spaces adapted to be sealed by liquid in said receptacle, means for leading gas from a point outside the pump to one of said gas spaces and means for leading gas from the other of said gas spaces to a point outside the pump, said rotor being formed with gas inlet and exhaust conduits operative, when said receptacle contains liquid and said rotor is rotated, to put each bell into communication with said gas inlet space only when the bell is rising and with said gas outlet space only when the bell is falling, the arrangement being such that the inlet and exhaust conduits of each bell are both sealed by liquid when the bell is at its extreme upper position and when it is at its extreme lower position so that the bell is cut off from both gas spaces.

2. A gas delivery pump for doling out gas at a predetermined rate, comprising in combination, a rotor mounted for rotation about an inclined fixed axis and including six measuring bells arranged equidistantly about the axis of rotation and parallel with said axis so that their outside surfaces are in contact, a receptacle for liquid, walls defining two separate gas spaces adapted to be sealed by liquid in said receptacle, means for leading gas from a point outside the pump to one of said gas spaces and means for leading gas from the other of said gas spaces to a point outside the pump, said rotor being supported in a position such that the ends of said measuring bells extend downwards into said receptacle so that said measuring bells may be sealed by liquid in said receptacle in all positions of said rotor, and said rotor being formed with gas inlet and exhaust conduits operative, when said receptacle contains liquid and said rotor is rotated, to put each bell into communication with said gas inlet space only when the bell is rising and with said gas outlet space only when the bell is falling, the arrangement being such that the inlet and exhaust conduits of each bell are both sealed by the liquid when the bell is at its extreme upper position and when it is at its extreme lower position so that the bell is cut off from both gas spaces.

3. A gas delivery pump for doling out gas at a predetermined rate, comprising in combination, a rotor mounted for rotation about an inclined fixed axis and including at least four cylindrical measuring bells equidistantly spaced about the axis of rotation of said rotor, a receptacle, mercury within said receptacle, said rotor being supported in a position such that the axis of said measuring bells extend downwards into said receptacle so that said mercury seals the ends of said measuring bells, means for enclosing two gas spaces over the surface of said mercury, said rotor being formed with inlet and exhaust conduits operative, when said rotor is rotated, to put each bell into communication with one of said gas spaces only when the bell is rising so that gas is drawn into the bell from the one gas space and to put each bell into communication with the other gas space only when the bell is falling so that gas is expelled from the bell into the other gas space, the arrangement being such that the inlet and exhaust conduits of each bell are both sealed by the liquid when the bell is at its extreme upper position and when it is at its extreme lower position so that the bell is cut off from both gas spaces, and passages being provided for leading gas from a point outside the pump to the gas space from which gas is drawn into the bells and for leading gas to a point outside the pump from the gas space into which gas is delivered from the bells.

4. A gas delivery pump for doling out gas at a predetermined rate, comprising in combination, a rotor mounted for rotation about an inclined fixed axis, said rotor being formed with at least four measuring bells equidistantly spaced about the axis of rotation of said rotor, with a number of cavities in communication with each other, with an annular cavity surrounding said measuring bells and said communicating cavities and with gas inlet and exhaust conduits, a receptacle arranged to enclose the lower end of said rotor so that said receptacle may contain liquid which serves to seal said measuring bells, said communicating cavities and said annular cavity, so that said communicating cavities and said annular cavity provide two separate gas spaces, said gas inlet and exhaust conduits being operative, when said rotor is rotated and said bells and gas spaces are sealed with liquid, to put each bell into communication with one of said gas spaces only when the bell is rising so that gas is drawn by the bell from the one gas space and with the other of said gas spaces only when the bell is falling so that gas is expelled from the bell into the other gas space, the arrangement being such that each bell is cut off from both of said gas spaces when the bell is at its extreme upper position and when it is at its extreme lower position, and passages being provided for leading gas from a point outside the pump to the gas space which supplies the bells with gas and for leading gas to a point outside the pump from the gas space which is supplied with gas by the bells.

5. A gas delivery pump for doling out gas at a predetermined rate, comprising in combination, a rotor mounted for rotation about an inclined fixed axis and formed from a moulding composition so as to provide six cylindrical tubes serving as measuring bells arranged symmetrically about the axis of rotation of said rotor, a receptacle for liquid, said rotor being supported in a position such that the ends of said measuring bells extend downwards into said receptacle so that said measuring bells may be sealed by liquid in said receptacle in all positions of said rotor, and walls defining two gas spaces adapted to be sealed by liquid in said receptacle, said rotor being formed with gas inlet and exhaust conduits operative when said receptacle contains liquid and said rotor is rotated to put each bell into communication with one of said gas spaces only when the bell is rising so that gas is drawn by the bell from the one gas space and with the other of said gas spaces only when the bell is falling so that gas is expelled from the bell into the other gas space, the arrangement being such that the inlet and exhaust conduits of each bell are both sealed by the liquid so that the bell is cut off from both gas spaces when the bell is at its extreme upper position and when it is at its extreme lower position, and passages being arranged to lead gas from a point outside the pump to the gas space from which gas is supplied to the bells and to lead gas from the other gas space to a point outside the pump.

6. A gas delivery pump for doling out gas at a predetermined rate, comprising in combination, a rotor mounted for rotation about an inclined fixed axis and including at least four cylindrical measuring bells equidistantly spaced about the axis of rotation of said rotor, a receptacle for liquid, said rotor being supported in a position such that the ends of said measuring bell may be sealed by liquid in said receptacle in all positions of said rotor, and the latter being formed with two cavities adapted to be sealed by liquid in said receptacle so as to provide two gas spaces and also formed with gas inlet and exhaust conduits operative when said receptacle contains liquid and said rotor is rotated to put each bell into communication with one of said gas spaces only when the bell is rising so that gas is drawn from the one space into the bell and with the other of said gas spaces only when the bell is falling so that gas is expelled from the bell into the other space, the arrangement being such that the inlet and exhaust conduits of each bell are both sealed by the liquid when the bell is at its extreme upper position and when it is at its extreme lower position so that the bell is cut off from both gas spaces, and passages being provided for leading gas from a point outside the pump to the gas space from which gas is drawn by the bells and to a point outside the pump from the space which is supplied with gas by the bells.

7. A gas delivery pump for doling out gas at a predetermined rate, comprising in combination a cylindrical receptacle, means for supporting said cylindrical receptacle so that its axis is inclined, a rotor mounted for rotation about an inclined axis and including at least four cylindrical measuring bells equidistantly spaced by the axis of rotation of said rotor, said rotor being supported in a position such that its axis of rotation is coincident with the axis of the cylindrical receptacle and that the ends of said measuring bells extend downwards into said receptacle so that said measuring bells may be sealed by liquid in said receptacle in all positions of said rotor, walls carried by said rotor and adapted to enclose two gas spaces which are normally sealed by liquid in said receptacle, said rotor being formed with inlet and exhaust conduits operative when said receptacle contains liquid and said rotor is rotated to put each bell into communication with one of said gas spaces only when the bell is rising so that gas is drawn from the one space into the bell and with the other of said gas spaces only when the bell is falling so that gas is expelled from the bell into the other gas space, the arrangement being such that the inlet and exhaust conduits of each bell are both sealed by the liquid so that the bell is cut off from both gas spaces when the bell is at its extreme upper position and when it is at its extreme lower position and passages being provided for leading gas from a point outside the pump to the gas space from which gas is withdrawn by the bells and for leading gas to a point outside the pump from the other gas space.

8. A gas delivery pump for doling out gas at a predetermined rate, comprising in combination, a rotor including at least four measuring bells arranged symmetrically about the axis of rotation of said rotor, a cylindrical skirt surrounding said measuring bells and a second skirt surrounding the first mentioned skirt so as to provide a space between the two skirts, a receptacle, said rotor being mounted to rotate about an inclined axis within said receptacle so that the ends of said measuring bells extend downwards into said receptacle so that they may be sealed by liquid in said receptacle in all positions of said rotor, pipes serving to put the space between the two skirts into communication with a point outside the pump and the space within the inner skirt into communication with a point outside the pump, said rotor being formed with inlet and exhaust conduits operative when said receptacle contains liquid and said rotor is rotated to put each bell into communication with one of the spaces defined by said skirts only when the bell is rising so that gas is drawn from the one space into the bell and with the other spaces defined by said skirts when the bell is falling so that gas is expelled from the bell into the other space, the arrangement being such that the inlet and exhaust conduits of each bell are both sealed by the liquid so that the bell is cut off from both of said spaces when the bell is at its extreme upper position and when it is at its extreme lower position.

CHARLES VERNON BOYS.